United States Patent [19]

Ryan

[11] 4,092,606
[45] May 30, 1978

[54] QUADRAPHASE DEMODULATION

[76] Inventor: Alan M. Lovelace, Acting Administrator of the National Aeronautics and Space Administration, with respect to an invention of Carl R. Ryan, Hancock, Mich.

[21] Appl. No.: 808,510

[22] Filed: Jun. 21, 1977

[51] Int. Cl.² ............................................. H03D 3/00
[52] U.S. Cl. ...................................... 329/124; 331/4; 331/12; 331/64
[58] Field of Search ...................... 329/124, 125, 122; 331/4, 11, 12, 9, 64

[56] References Cited

U.S. PATENT DOCUMENTS

| | | | |
|---|---|---|---|
| 3,748,590 | 7/1973 | Gray | 329/125 |
| 3,768,030 | 10/1973 | Brown | 329/122 |
| 3,787,775 | 1/1974 | Lanning | 329/122 |
| 3,852,682 | 12/1974 | Dawe | 331/12 |

Primary Examiner—John Kominski
Attorney, Agent, or Firm—Robert D. Marchant; John R. Manning; John O. Tresansky

[57] ABSTRACT

A received, suppressed carrier, quadraphase shift key modulated (QPSK) signal is demodulated with a phase locked loop including a variable frequency, coherent reference that drives first and second channels also responsive to the QPSK signal. The channels respectively derive first and second replicas of binary signals that modulated the suppressed carrier. The replicas are combined to derive a variable amplitude error signal for controlling the coherent reference frequency. The frequency of the coherent reference is dithered at a low rate so that there is derived a relatively low level tracking error phase from the locked loop. The frequency of the coherent reference is swept when the phase of the error signal differs from the dithering phase by a predetermined value that is appreciably less than 90°.

14 Claims, 1 Drawing Figure

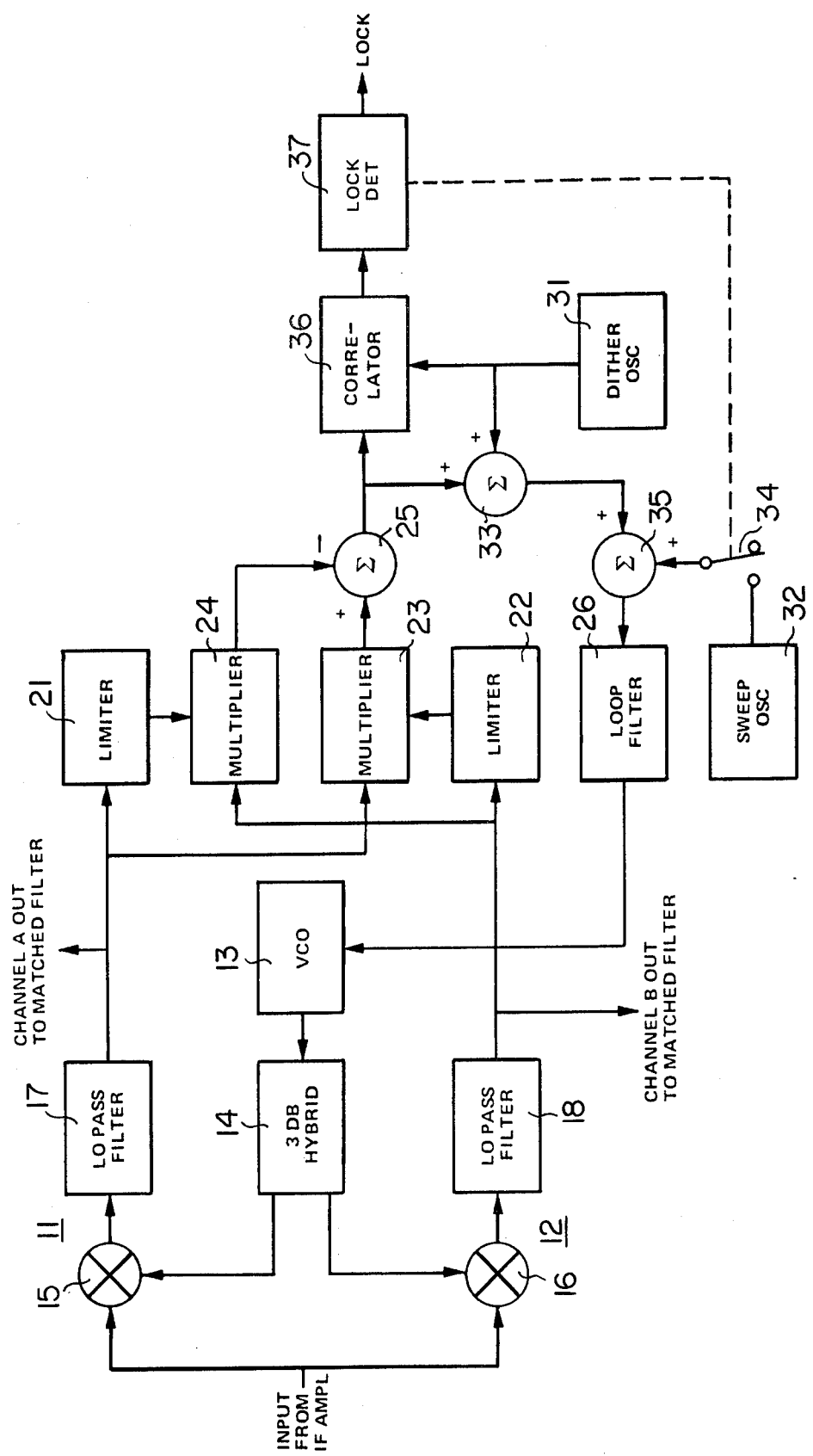

: 1

QUADRAPHASE DEMODULATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457), and may be manufactured and used by or for the Government for governmental purposes without the payment of any royalties thereon or therefor.

BACKGROUND OF THE INVENTION

The present invention relates generally to demodulating a suppressed carrier, quadraphase shift key (QPSK) modulated signal and more particularly, to a method and apparatus wherein the frequency of a coherent reference of a phase locked loop is dithered to derive an error signal that is compared with a source of the dithering frequency.

A widely used technique to transmit signals indicative of the binary levels of a pair of data modulating channels is quadraphase shift key (QPSK) signalling, wherein a transmitted suppressed carrier wave is represented as:

$$S(t) = \sqrt{P/2} \, [A \sin \omega_o t + B \cos \omega_o t] \quad (1)$$

wherein $P$ = the transmitted power, $\omega_o$ = the frequency of the carrier in radians per second, $A$ = the binary value of one modulating channel, and $B$ = the binary value of the other modulating channel.

The values of A and B are associated with channels that are frequently referred to as the in-phase and quadraphase channels; the values of A and B are selectively ± 1 for binary values of 1 and 0, respectively. The waveform given by Equation (1) is a suppressed carrier having one of four possible phase positions, and an amplitude of $\sqrt{P/2}$. The four phases are displaced from each other by 90° and differ from axes for the in-phase and quadraphase channels by ±45°. It is well recognized that signalling as represented by Equation (1) provides an efficient technique for transmitting digital data, both in terms of bandwidth and transmitter power. The bandwidth requirements are less than for single amplitude, frequency shift key modulation. Further, lower levels of transmitted power enable a given bit error rate (BER) to be achieved.

A problem with QPSK modulation is that it is difficult to maintain phase accuracy at the transmitting modulator. Inaccuracies in the relative phases of the signals derived from the QPSK modulator cause deviations from the ideal Equation (1) relationship, resulting in performance degradation that results in both signal amplitude loss and cross talk between the in-phase and quadraphase channels. It can be shown that the polarity of the cross talk between the channels is dependent on the modulating input data and causes a weaker or stronger effective signal to be derived for a particular bit period interval. The net result of the cross talk increases the average system BER and usually causes the BER to be dependent on a single channel, as well as both channels.

A receiver responsive to a transmitted QPSK signal demodulates the received signal into two original digital data signals, A and B. The demodulator generates a coherent reference which is compared with the input signal in a pair of quadraphase detection channels. Each channel includes a separate analog multiplier or mixer responsive to orthogonally phased components of the coherent reference and a replica of the received QPSK signal. The output signals of the mixers are applied to separate low pass filters, each having a band pass sufficiently high to enable the in-phase and quadraphase binary data to be derived as demodulated replicas of the transmitted in-phase and quadraphase data. The demodulated in-phase and quadraphase signals are typically combined to derive a control signal for a voltage controlled, variable frequency oscillator that derives the coherent reference source. The phase of the coherent reference, relative to the phase of the suppressed carrier QPSK signal supplied to the demodulator, must be very close to the original reference phase used in the modulator at the transmitter.

Various circuits have been used to control the coherent reference. However, the two most popular circuits are known as the times four/divide by four loop and the data estimation loop.

In the times four/divide by four loop, a replica of the received QPSK signal is frequency multiplied by four and mixed with the coherent reference that is also frequency multiplied by four. The mixer derives an output signal that is coupled through a low pass filter to control the frequency of the coherent reference. By frequency multiplying the coherent reference by four in a feedback loop, there is effectively a frequency division by four of the input to the multiplier from the receiver. The divide by four circuit is usually a phase locked loop with a loop bandwidth of 0.1% to 1% of the rate of the quadraphase data modulating the suppressed carrier. The narrow band loop removes most noise jitter present on the input signal and provides a stable reference for the phase detector formed by the mixer and low pass filter.

The major problem with the time four/divide by four loop is the inability of the loop to obtain adequate phase stability of the coherent reference. This problem becomes more difficult as the frequency supplied to the multiplier by the receiver increases. Also, at high data rates, the fourth harmonic of the frequency supplied to the multiplier can appear in the S or C band regions, which require difficult circuit designs.

In the data estimation loop, a Costas loop is formed by supplying the output signals of the orthogonal channel low pass filters to separate hard limiters. The output signals of the hard limiters are cross multiplied with the output signals of the low pass filters to derive estimates of the transmitted data. The estimates are compared to derive an error signal that is coupled to a loop filter, which in turn controls frequency of the coherent reference.

A major problem with the data estimation loop is that there is a possibility for the loop to lock onto relatively low spectral components that are removed in frequency from the suppressed carrier frequency of the received signal. Such relatively low amplitude spectral components are referred to as false lock components or points. The possibility of a false lock is aggravated because of data dependent noise introduced onto the signal by the modulator.

Design equations for data estimation loops have been based on small signal, error free conditions and have not, in general, represented operation for a real system. In particular, the data estimation loop has at least the following deficiencies: (1) the loop provides an error signal for the voltage controlled oscillator, but a signal to indicate lock status is not derived; (2) the design equations for the data estimation loop do not take into account the finite gain of the hard limiters; (3) the bandwidth limiting of the modulated signal is not considered; (4) transient behavior is not considered; and (5) gain and bias offsets are not considered.

SUMMARY OF THE INVENTION

In accordance with the present invention, three fundamental properties of a second order data estimation, phase locked loop are used to minimize the probability of a false lock point. These properties are: (1) the frequency tracking range of the loop is significantly reduced when the loop gain is reduced; (2) the phase locked loop is less stable when the loop gain is reduced; and (3) when a phase locked loop is subjected to a frequency offset, the loop has a tendency to become more unstable. If a false lock point occurs, most of these factors are present so that the loop instability is significant, resulting in greater sensitivity to phase displacement in the loop error signal.

These properties are utilized by employing a frequency dither signal and a frequency sweep signal in combination to provide necessary perturbations to a coherent reference so that a phase locked loop breaks lock from a false lock point but the loop tracks the desired, large amplitude, spectral component. The variable frequency oscillator frequency is dithered so that the coherent reference is a frequency well within the normal loop bandwidth, and a frequency tracking error of approximately 2° is derived. The frequency sweep range of the sweep signal is selected such that maximum phase error of approximately 10° is derived for a static condition. The sweep rate of the sweep oscillator is selected to provide approximately a 15° phase error. The phase locked loop loses lock in response to the phase error exceeding ± 30°, a considerable deviation from the four possible lock points for a data estimation loop, which are separated from each other by 90°. It has been found that the above conditions are met with a worse case desired signal component and a maximum loop phase error of 17°, well within the ± 30° loss of lock threshold. If the phase locked loop attempts to lock onto and track a false lock point that is less than the desired signal, a dither tracking error has an increased amplitude, to cause an increased static error and an increased sweep rate error. These factors combine to cause the resultant phase locked loop phase error to exceed the ± 30° loss of lock threshold.

A further, important aspect of the invention is that an indication of lock status is derived by phase comparing the phase locked loop phase error signal with a dithering signal for the coherent reference. In response to a phase error between the dither source and the phase error being less than 30°, it can be assumed that a true lock point has been achieved and there is no need to sweep the coherent reference frequency. However, if the phase error between the dither source and the phase error voltage exceeds 30°, a false lock point has been reached and the sweep source is activated.

It is, accordingly, an object of the present invention to provide a new and improved QPSK demodulator, particularly adapted to prevent false lock points which can occur in response to noise from modulation errors.

Another object of the invention is to provide a QPSK demodulator loop including means for detecting if the loop has locked onto a false lock point or if the loop is locked onto the suppressed carrier.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

The FIGURE is a block diagram of a preferred embodiment of the invention.

DESCRIPTION OF THE PREFERRED EMBODIMENT

Reference is now made to the FIGURE wherein there is illustrated a block diagram of a quadraphase demodulator in accordance with a preferred embodiment of the invention. A received, suppressed carrier, quadraphase modulated signal derived from an IF amplifier of a receiver is applied in parallel to a pair of orthogonal, phase detecting channels 11 and 12, respectively referred to as in-phase (I) and quadrature (Q) channels. Channels 11 and 12 are driven by orthogonally phased coherent reference signals derived from voltage controlled oscillator 13, having an output that is supplied to the channels by 3 db hybrid 14.

The orthogonally phased output signals of hybrid 14 are supplied to analog multipliers or mixers 15 and 16 which are driven in parallel by the output of the IF amplifier. Multipliers 15 and 16 derive signals that are respectively applied to low pass filters 17 and 18, having cutoff frequencies sufficiently high to enable the binary data contained in the orthogonal channels of the received quadraphase signal to be derived as base band signals at the outputs of the filters. Thereby, the output signals of low pass filters 17 and 18 represent the binary levels of the two binary signals which originally modulated the suppressed carrier signal at a transmitter to which the receiver including the demodulator of the invention is responsive.

The output signals of filters 17 and 18 are combined to derive an error signal having an amplitude that controls the frequency of oscillator 13. The apparatus for deriving the error signal is known, and is basically a Costas loop. In particular, the output signals of filters 17 and 18 are respectively hard limited in limiters 21 and 22; the hard limited signals are cross multiplied in multipliers 23 and 24 with the outputs of the filters. The output signals of multipliers 23 and 24 are compared in subtractor 25, which derives an output signal directly proportional to the difference between the output signals of multipliers 23 and 24. The output signal of difference circuit 25 is applied to a control input of voltage controlled, variable frequency oscillator (VCO) 13, by loop filter 26 that is designed to establish a second order phase locked loop. The apparatus previously described in connection with FIG. 1 is well known.

In accordance with the present invention, the frequency of oscillator 13 is dithered by oscillator 31 and is selectively, slowly swept by sweep oscillator 32 to provide perturbations in the phase locked loop error signal derived from circuit 25 necessary to break a lock from a low amplitude spectral component in the output of the IF amplifier. If the desired suppressed carrier spectral component is being tracked, sweep oscillator 32 is decoupled from VCO 13, however, the VCO is continually dithered by oscillator 31 at a frequency well within the normal loop bandwidth so that a tracking error signal at the output of circuit 25 of approximately 2° is derived. If sweep oscillator 32 is connected in circuit, the frequency of VCO 13 is swept by it over a frequency range such that the maximum phase error at the output of circuit 25 is approximately 10° for a static condition. The sweep rate of oscillator 32 is selected to provide approximately a 15° phase error in the output signal of circuit 25. Sweep oscillator 32 is connected in circuit only if the phase error at the output of circuit 25 exceeds ± 30°, a 60° total deviation from each of the four desired lock points, which are separated from each other by 90° and from the orthogonal coherent outputs of hybrid 14 by ± 45°.

To these ends, dither oscillator 31 is connected in the path between the output of circuit 25 and the control input of VCO 13 by a summing network 33 that is responsive to the dither oscillator output and the output of difference circuit 25. Dither oscillator 31 derives a square wave having an amplitude which varies the frequency of VCO 13 by approximately 0.5% peak to peak. The approximately 0.5% peak to peak variation in the frequency of VCO 13 caused by the output of dither oscillator 31, results in an error signal from the output of circuit 35 of approximately 2°.

Hence, if the IF signal applied to channels 11 and 12 has no noise whatsoever and the suppressed carrier is being tracked by VCO 13, the output of circuit 25 is a square wave having a frequency equal to the dither frequency and an amplitude corresponding to approximately 2° phase error. Of course, the frequency of oscillator 31 is selected so that it is appreciably lower than the cutoff frequency of loop filter 26, which can be selected, in one preferred embodiment to be any one of 3 kHz, 10 kHz or 30 kHz. In this case, the dither frequency was chosen to be 500 Hz.

Slow sweep oscillator 32 is selectively connected in the feedback loop between the output of difference circuit 25 and the control input of VCO 13 by switch 34 that connects the sweep oscillator output to one input of summing network 35, having a second input responsive to the output of summing network 33. Summing network 35 derives an output signal that is coupled to loop filter 26, which drives the control input of the VCO. In one preferred embodiment, sweep oscillator 32 operates at approximately 0.01% of the phase locked loop bandwidth and covers a frequency uncertainty range of ± 300 kHz, for an IF carrier frequency of 110 mHz.

Switch 34 is activated to the closed state, to connect the output of sweep oscillator 32 in circuit to control the frequency of VCO 13 when the error signal derived from circuit 25 has a phase that differs from the phase of dither oscillator 31 by a predetermined amount which is appreciably less than 90°, and is typically approximately ± 30°. To this end, the output signals of dither oscillator 31 and circuit 25 are phase compared in correlator 36. Correlator 36 derives a DC output signal having a value proportional to the cosine of the phase difference between the output signals of circuit 25 and dither oscillator 31. In response to the output signal of correlator 36 being less than a predetermined value, associated with the cosine of ± 30°, lock detector 37 is energized to close switch 34 and connect oscillator 32 in circuit with VCO 13. In response to the opposite situation, lock detector 37 derives a binary one level which is supplied to a suitable lock indicator, such as a lamp.

When the phase locked loop of FIG. 1 attempts to lock onto and track a false lock point, i.e., a low amplitude spectral component that is removed from the suppressed carrier, a resultant error in excess of ± 30° occurs at the output of summing amplifier 25 in response to increased values for the dither tracking error, the static error, and the sweep rate error.

Lock detector 37 is designed to allow approximately ¼ of a sweep cycle of sweep oscillator 32 to be completed before switch 34 is open circuited and there is a disabling of the sweeping of oscillator 13 in response to the output of sweep oscillator 32. The ¼ sweep cycle is sufficient to cause the sweep rate error to build up close to a maximum value. If the gain of the phase locked loop is sufficient so that the loop tracks the suppressed carrier, the error is less than 30°. In contrast, if the loop gain is excessively low, as occurs with a false lock point, the 30° threshold that is detected by lock detector 37 is exceeded before the ¼ sweep time is reached.

It has been found that the low speed sweep of sweep oscillator 32 and the frequency variation caused by dither oscillator 31 eliminate false lock conditions because false lock conditions are characterized by marginally stable lock points and are easily dislodged from this undesirable condition by the perturbations of dither oscillator 31 and sweep oscillator 32.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A phase locked loop for demodulating a suppressed carrier QPSK modulated input signal that is subject to noise to cause phase shift of phase indications for first and second binary modulation channels, comprising a coherent reference source, means responsive to the coherent source and input signal for deriving first and second replicas of the binary information in the first and second channels, means for combining said replicas to derive a variable amplitude error signal, a dither oscillator, means for controlling the frequency of said coherent source in response to the error signal and an output of the dither oscillator, and means for comparing the error signal with the dither oscillator output to provide an indication of phase lock between the suppressed carrier and the coherent reference.

2. The phase locked loop of claim 1 further including a sweep oscillator, and means for selectively controlling the frequency of the coherent source by the sweep oscillator in response to the phase lock indication.

3. The phase locked loop of claim 2 wherein said sweep oscillator has a sweep rate that varies the frequency of the coherent source slowly compared to the rate at which the coherent source responds to the dither oscillator output and the error signal.

4. The phase locked loop of claim 2 wherein the comparing means includes means for indicating an approximately in-phase relationship between the dither oscillator and the error signal.

5. The phase locked loop of claim 1 wherein the comparing means includes means for indicating an approximately in-phase relationship between the dither oscillator and the error signal.

6. The phase locked loop of claim 1 wherein the means for combining includes means for limiting the amplitude of said first and second replicas to drive first and second limited signals, means for cross multiplying the first and second replicas with the first and second limited signals to derive a pair of product signals, and means for combining the product signals to derive the error signal.

7. The phase locked loop of claim 6 further including a sweep oscillator, and means for selectively controlling the frequency of the coherent source by the sweep oscillator in response to the phase lock indication.

8. The phase locked loop of claim 7 wherein said sweep oscillator has a sweep rate that varies the frequency of the coherent source slowly compared to the rate at which the coherent source responds to the dither oscillator output and the error signal.

9. The phase locked loop of claim 7 wherein the comparing means includes means for indicating an approximately in-phase relationship between the dither oscillator and the error signal.

10. The phase locked loop of claim 6 wherein the means for deriving the replicas includes first and second phase detectors separately responsive to orthogonal replicas of the variable frequency oscillator, both of said detectors being simultaneously responsive to the input signal.

11. A method of demodulating a suppressed carrier QPSK modulated input signal with a phase locked loop, said signal being subject to noise to cause phase shift of phase indications for first and second binary modulation channels, said loop including: a coherent reference source, means responsive to the coherent source and the input signal for deriving first and second replicas of the binary information in the first and second channels, means for combining said replicas to derive a variable amplitude error signal, means for controlling the frequency of said coherent source in response to the error signal; comprising the steps of: dithering the frequency of the coherent source at a rate low enough to provide tracking phase errors of relatively low amplitude that can be tracked while the loop is locked, and sweeping the frequency of the coherent source in response to the phase of the error signal differing from the phase of the dithering for the coherent source by a predetermined amount that is appreciably less than 90°, the coherent source frequency being swept at a rate that causes a phase error that is appreciably less than the predetermined amount.

12. The method of claim 11 wherein the tracking phase errors are approximately 2°, the predetermined amount being approximately 30°, the sweep rate causing a phase error of approximately 15°.

13. A phase locked loop for demodulating a suppressed carrier QPSK modulated input signal that is subject to noise to cause phase shift of phase indications for first and second binary modulation channels, comprising a coherent reference source, means responsive to the coherent source and input signal for deriving first and second replicas of the binary information in the first and second channels, means for combining said replicas to derive a variable amplitude error signal, a dither oscillator, means for controlling the frequency of said coherent source in response to the error signal and an output of the dither oscillator, a sweep oscillator, and means for connecting the sweep oscillator as frequency control input for the coherent source in response to a comparison of the error signal and the dither oscillator output.

14. The method of claim 13 wherein the means for connecting includes means for determining the presence of an approximately in-phase relationship between the dither oscillator and the error signal.

* * * * *